J. D. JARRETT.
VEHICLE BRAKE.
APPLICATION FILED JAN. 28, 1910.
1,001,527.
Patented Aug. 22, 1911.
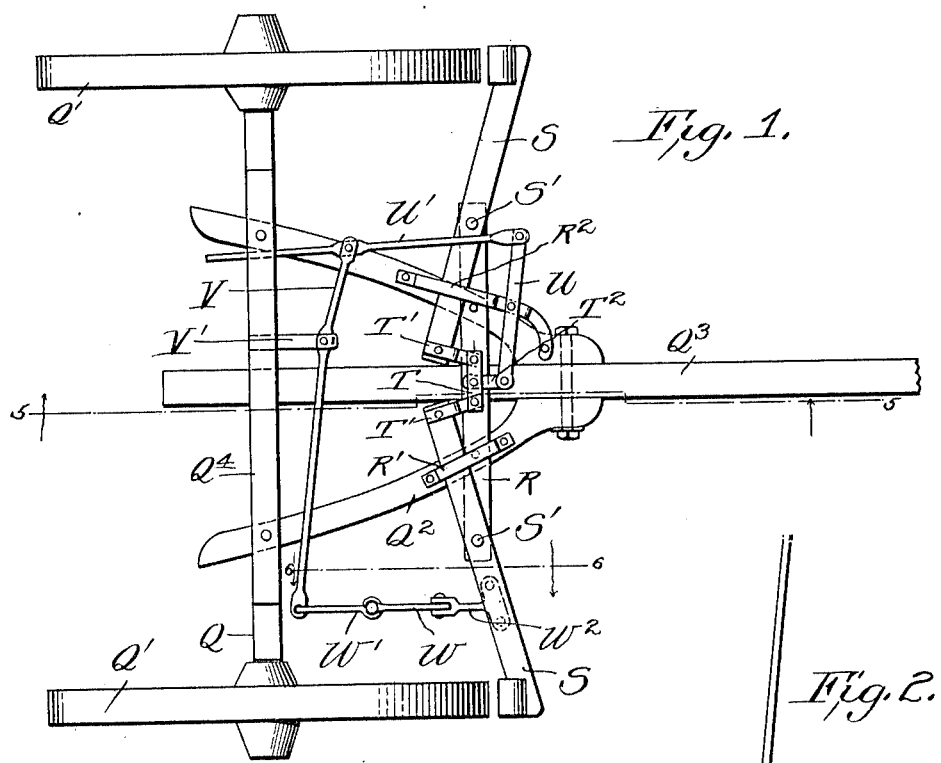
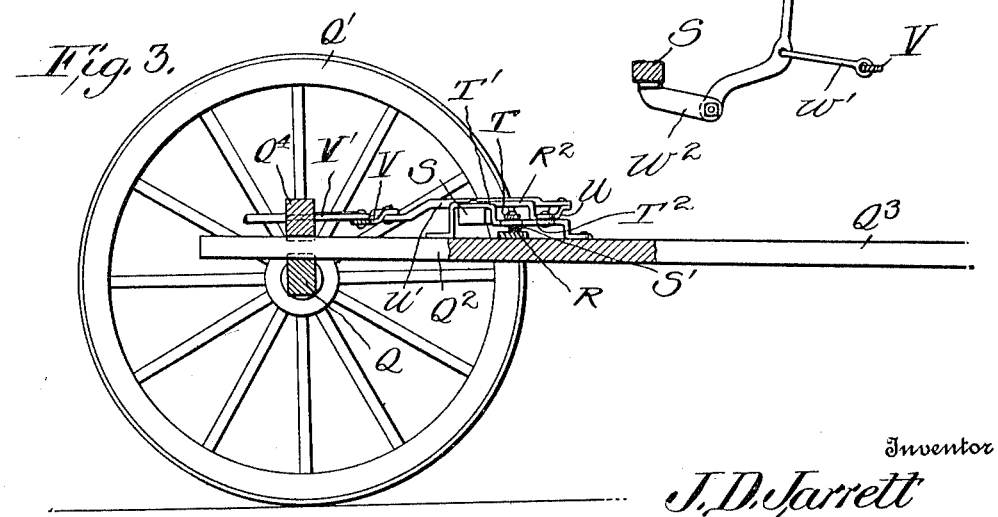
Witnesses
Oliver W. Holmes
James R. Pattison.
Inventor
J. D. Jarrett
By O'Meara Brock
Attorney

UNITED STATES PATENT OFFICE.

JEFFERSON DAVIS JARRETT, OF TRENTON, GEORGIA.

VEHICLE-BRAKE.

1,001,527.

Specification of Letters Patent.   Patented Aug. 22, 1911.

Application filed January 28, 1910. Serial No. 540,547.

*To all whom it may concern:*

Be it known that I, JEFFERSON D. JARRETT, a citizen of the United States, residing at Trenton, in the county of Dade and State of Georgia, have invented a new and useful Improvement in Vehicle-Brakes, of which the following is a specification.

This invention relates to vehicle brakes, the object being to provide a brake which is so constructed that the same can be quickly attached to a vehicle in such a manner that the same can be readily operated so as to lock the same with great power.

Another object of the invention is to provide a brake which is so constructed that power will be applied to each of the brake shoes so that both of the wheels will be locked firmly at the same time thereby overcoming the disadvantages of brakes of this character now in use as when the shoes are carried by the brake beam, one of the same becomes worn more than the other when the brake is operated and will not engage the respective wheel of the vehicle, and thereby only one of the wheels is locked by the brake.

A still further object of the invention is to provide a pair of pivoted brake levers which are so operated that brake power can be applied to the same by simply operating the lever which is arranged within easy reach.

Another object of the invention is to provide a brake which is exceedingly simple and cheap in construction and one in which the parts are so connected that a very strong and durable brake is formed which is not likely to get out of order in use.

With these objects in view, my invention consists of the novel features of construction, combination and arrangement of parts hereinafter fully described, pointed out in the claims and shown in the accompanying drawings, in which, Figure 1 is a top plan view of the rear portion of the running gear of a wagon, showing my improved brake plate thereto. Fig. 2 is a section taken on line 5—5 of Fig. 1. Fig. 3 is a section taken on line 6—6 of Fig. 1.

In the drawings Q indicates the rear axle of a vehicle provided with wheels $Q'$, hounds $Q^2$ and a reach $Q^3$, all of which are of the usual construction. In applying my brake to such a vehicle I secure to the hounds $Q^2$ a cross bar R over which I arrange guide brackets $R'$ and $R^2$ for holding brake levers S in proper position. These brake levers are pivotally mounted on the outer ends of the cross bar R as shown at $S'$ and are provided with brake-shoes at their outer ends adapted to engage the wheels $Q'$. Pivotally connected to the inner ends of the brake levers S are links $T'$ which are connected to a cross bar F to which is connected centrally a link $T^2$ which is pivotally connected to a lever U which is pivotally mounted on the bracket $R^2$ as clearly shown so that when said lever is swung upon its pivot so as to throw the inner end outwardly the inner ends of the brake levers or beams will be drawn outwardly so as to throw the outer ends against the wheels.

For operating the lever U I provide the rear bolster $Q^4$ of the wagon with a guide opening through which extends a rod $U'$ which is pivotally connected to the lever U and is provided with a flattened portion to which is pivotally connected a lever V mounted on a bracket $V'$ extending outwardly from the bolster $Q^4$. Connected to the free end of the lever V is a link W which is pivotally connected to an operating lever $W'$ having a curved lower end which is mounted in a bracket $W^2$ carried by one of the brake levers S so that when the operating lever $W'$ is moved forwardly the brake beams will be carried into such a position that the shoes will lock the wheels, when the lever is moved rearwardly the levers will be thrown out of engagement with the wheels.

It will be seen that by constructing a brake as hereinbefore described, as the lever for operating the same is moved forwardly the pivoted brake beam will be swung in such a manner that the shoes carried by the same will be thrown into engagement with the wheels independently of each other so that in case one of the shoes becomes worn more than the other the same pressure will be brought to bear on the respective wheels.

While I have shown and described my improved brake operated by a lever arranged adjacent the brake levers it is of course understood that the operating lever can be arranged in any place on the vehicle and connected to the brake levers by an operating rod.

What I claim is:—

The combination with a vehicle, of a cross bar secured to the hounds of the running gear of the vehicle, guides carried by said hounds, brake beams pivoted on the ends of said cross bar extending under said guides, a cross head connected to the inner ends of said brake beams by links, a link carried by said cross head, a pivoted lever connected to said link, a bar connected to the free end of said lever, a second lever connected to said bar intermediate its ends, and a hand operated lever connected to said second lever, said hand operated lever being pivoted in a bracket carried by one of the brake beams.

JEFFERSON DAVIS JARRETT.

Witnesses:
LEE FORESTER,
W. N. JACOWAY.

Copies of this patent may be obtained for five cents each, by addressing the "Commissioner of Patents, Washington, D. C."